United States Patent Office 3,207,813
Patented Sept. 21, 1965

3,207,813
NOVEL POLYEPOXIDE COMPOSITIONS OF MATTER AND METHODS AND STEPS FOR PRODUCING THE SAME
Mortimer T. Harvey, South Orange, N.J., assignor to Harvel Research Corporation, Elizabeth, N.J., a corporation of New Jersey
No Drawing. Filed Feb. 9, 1962, Ser. No. 172,116
9 Claims. (Cl. 260—834)

This invention relates to novel compositions of matter, to methods for producing them and also to novel products produced by employing them as components thereof. In one of its more specific aspects the invention is directed to novel composition of matter in which there are employed as components thereof certain non-resinous organic reaction products, produced with aniline or its homologs as a starting material, examples of said homologs being toluidines and xylidines.

In the course of my experimentations, I have discovered that non-resinous organic reaction products which are monomeric, dimeric and trimeric compounds as well as mixtures thereof produced by reacting aniline and its homologues with aliphatic aldehydes were compatible with polyepoxides and imparted certain desirable characteristics thereto when such combinations were cured and also in certain of such combinations very surprisingly and unexpectedly reduced the curing time without decreasing the shelf life thereof below that which would be generally acceptable commercially.

Such monomeric compounds produced by reacting one mole of said aldehydes with one mole of aniline, toluidines and xylidines are anhydroaldehydeaniline, anhydroaldehydetoluidines and anhydroaldehydexylidines apparently of the following formula:

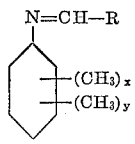

wherein R is selected from the group consisting of hydrogen and aliphatic hydrocarbon radicals, $x$ is selected from the group consisting of zero and one and $y$ is selected from the group consisting of zero and one.

The polyepoxides used were those possessing more than one vicinal epoxy group per average molecule, i.e., more than one

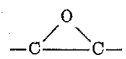

group per average molecule and are sometimes referred to in the art as having a vicinal epoxy equivalency greater than 1.0. Examples of such polyepoxides, which may be either liquid or solid, monomeric or polymeric are well known to those skilled in the art of polyepoxides and are to be found in the literature and issued patents. Those which I prefer to use are such polyepoxides which are glycidyl polyethers of polyhydric phenols and aliphatic polyhydric alcohols, and are produced by reacting epichlorhydrin with polyhydric phenols and polyhydric aliphatic alcohols. Some of such polyepoxides are disclosed in U.S. Patent 2,839,488 issued to me and Peter L. Rosamilia on June 17, 1958. So much of the disclosure in said patent relating to such glycidyl polyethers as well as methods for making them is incorporated by reference into this specification.

Prior to this invention, polyepoxides have been combined with various types of curing agents. The classes of such agents most commonly employed are amines and polycarboxylic organic acids, and by the latter term as used herein I mean to include the acids as well as their available anhydrides. Examples of some of said curing agents are those recited in the U.S. patent of David Wasserman, No. 2,891,026 issued on June 16, 1959; and so much of said disclosures as relates to said curing agents is by reference made part of this specification.

In general, when said polycarboxylic acids are used as curing agents for said polyepoxides, such combinations must be maintained at elevated temperature for a considerable number of hours to affect curing thereof. As a consequence, it has been proposed to add an accelerator to such combination in order to reduce the curing time thereof. Some of the accelerators which have been commonly used for that purpose are boron trifluoride complexes, and "DMP–30" (tridimethyl amino methyl phenol). While the addition of such accelerators has been effective in reducing the curing time of such combinations, it has been found that the shelf life of such combinations together with the accelerator employed is low and in fact so low as to result in a great deal of waste in certain instances, and also to render unfeasible commercially the sale of compositions consisting of such combinations together with the accelerator therein.

I have discovered that the addition of said non-resinous monomeric, dimeric and trimeric compounds serve as excellent accelerators when combined with compositions of matter comprising a polyepoxide and a polycarboxylic acid curing agent therefor. I was surprised to discover that when about 0.5–20 parts by weight of said non-resinous monomeric, dimeric and trimeric compounds per 100 parts of polyepoxides are combined with a heat curable composition consisting of a polyepoxide and a polycarboxylic acid, that the curing times of such combinations were greatly reduced and that the shelf life of such combinations were unexpectedly high. I was further surprised to discover that said monomeric, dimeric and trimeric compounds were not only compatible with said polyepoxides, but in addition did not "throw-out," "flower," or "bleed out" of said polyepoxides when cured in the presence thereof together with amine hardening or curing agents. Such cured polyepoxides were tested and it was found that said monomeric, dimeric and trimeric compounds which may or may not have reacted with the polyepoxides acted as plasticizers and improved the flexibility of the cured masses, as well as the toughness and chemical resistance thereof. For the aforesaid purpose, I prefer to employ about 1–40 parts by weight of said monomeric, dimeric and trimeric compounds per 100 parts of the weight of polyepoxide employed. I was further surprised to discover that when said monomeric, dimeric and trimeric compounds were combined with said polyepoxides even when the ratio by weight thereof to the weight of the polyepoxide was as high as 25–100, that such two component combinations exhibited no appreciable thickening after being allowed to remain in a room at 70° F. for a period of 6 months.

The non-resinous reaction organic products which are either monomeric, dimeric or trimeric compounds or mixtures of 2 or more of them employed in the practice of this invention are preferably produced by reacting aniline or a homolog thereof and an aldehyde in the mole ratio of 1–1 under pH conditions of about 4–7.5. The reaction is preferably carried out by employing aniline or a homolog thereof and an aldehyde in the mole proportion of 1 mole of aniline or homolog thereof to more than 1 mole of aldehyde so that there is always present in the course of reaction an excess of aldehyde thus assuring reaction of substantially all of the aniline or homolog thereof. The aldehydes which are preferably employed are the aliphatic aldehydes having a maximum of 16 carbon atoms and being saturated or ethylenically unsaturated. Examples of some of the latter are crotonaldehyde and acrylic aldehyde. Those more preferably employed are the saturated alphatic aldehydes of 1–16 carbon atoms and most preferably such aldehydes of at least 2 carbon atoms so that there may be obtained compositions of matter at least 50% by weight of which are monomeric compounds and are further characterized as being stable in color and viscosity and reproductive uniformity, and being substantially non-fuming at elevated temperatures normally employed in curing polyepoxides with a polycarboxylic acid curing agent.

Said non-resinous monomeric, dimeric and trimeric compounds have a toxicity characteristic greatly below that of aniline itself as well as some other aniline reaction products. In fact, their toxicity characteristic may well be below such value as to be acceptable in the resin field.

The following are examples given by way of illustration and not limitation of some of said non-resinous compounds which are employed in the practice of the present invention, and methods for making them, all parts being given by weight unless otherwise specified.

Example A 600 grams of aniline were charged into a glass reaction vessel having a stirrer therein. Also charged into said vessel were 600 cc. of water and while said mass was being constantly stirred, 510 grams of aqueous formaldehyde (37% concentration) were slowly added thereto in small increments over about a 1-hour period so that the temperature of the reacting mass, which was exothermic, did not rise above 75° C. In the course of the reaction, the appearance of the mass while being stirred changed from a two-phase oily material in water to a mass of gummy consistency and finally to a solid material which was broken up due to the stirring in water. The stirrer was removed and the mass in the vessel was then permitted to settle and cool to room temperature, after which most of the water was decanted therefrom and was found to have a specific gravity of 1 and having very little, if any, formaldehyde therein. The mass remaining in the vessel was filtered and the solid material was spread in a thin layer and permittted to dry at room temperature over a 48 hour period. The dry reaction mass, known as Product A, was a powder slightly off-white in color, had a melting point of 128° C., contained no hydroxyl groups volatilized at 150° C. At least 70% by weight of said Product A was apparently a trimer of

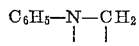

Said Product A was recrystallized with toluene and there was obtained white crystalline material known herein as Product $A_1$. Said Product A and $A_1$ were subjected to the standard LD50 toxicity test and the results were as follows: As to Product A, 1.6 g./kg. and as to Product $A_1$, no evedence of toxicity at 6.4 g./kg.

Example B 270 grams of aniline were charged into a glass raction vessel having a reflux condenser attached thereto. Located in said vessel is a stirrer. While being constantly stirred, 240 grams of butyraldehyde (commercial grade) were also charged into said vessel and the mass was externally heated so that the temperature thereof was elevated to and maintained in the range of 100° C.–110° C. for a period of 2 hours. The mass in said vessel was then heated slowly to a temperature of 150° C. while being maintained under subatmospheric conditions of 20 mm. of mercury pressure. At the end of this step the yield of aniline-butyraldehyde organic reaction product, hereinafter known as Product B, was measured and was found to be 410 grams; and in the course of said heating under said reduced pressure conditions, a distillate was recovered. The distillate consisted of 45 cc. of water and 60 cc. of a light volatile distillate which I found could be reacted with butyraldehyde indicating that more butyraldehyde should have been used in the original mixture.

Said Product B was a thin liquid of a brownish color and had a viscosity of about 50 centipoises at 25° C. At least 50% by weight of said Product B was monomeric anhydrobutyraldehydeaniline apparently of the formula $$C_5H_6—N=CH—C_3H_7$$

Said product B also, I believe, contained some dimers and trimers of said compound.

Example C 270 grams of aniline were charged into a glass reaction vessel having a reflux condenser attached thereto and a stirrer located therein. Then while being constantly stirred, 300 grams of butyraldheyde (commercial grade) were also charged therein and by the used of external heat, the temperature of the mass therein was increased to and maintained at 100° C.–110° C. for a period of 2 hours. The mass therein while being maintained at subatmospheric pressure of 20 mm. of mercury pressure was slowly heated to a temperature of 150° C. thereby to dehydrate and remove therefrom water and light volatile distillate which were collected, leaving behind in said vessel, 430 grams of aniline-butyraldehyde organic reaction product measuring 430 grams, hereinafter known as Product C, being a thin liquid of brownish color and having a viscosity of about 50 cp. at 25° C. The light volatile distillate was separated from the water, was water insoluble and showed no reaction with butyraldehyde when tested. Said Product C was similar to Product B and at least 50% by weight thereof was monomeric butyraldehydeaniline apparently of the formula $C_6H_5—N=CH—C_3H_7$. Said Product C was subjected to said LD50 toxicity test and was found to be 4 g./kg.

Example D 100 grams of aniline and 100 grams of isopentaldehyde were charged into a glass reaction vessel equipped with a stirrer and reflux condenser. While being constantly stirred and by the use of external heat, the mass in said vessel was increased to and maintained at a temperature of 100° C.–110° C. for a period of 1 hour. Then the mass in the vessel, while under sub-atmospheric pressure of 10 mm. of mercury pressure, was slowly heated to 150° C. thereby to remove water and volatiles leaving behind anilineisopentaldehyde organic reaction product which was a thin liquid having a viscosity of about 50 cp. at 25° C. and is hereinafter known as Product D. At least 50% by weight of Product D is monomeric anhydroisopentaldehydeaniline apparently of the formula $C_6H_5—N=CH—C_4H_9$.

Example E

The same apparatus and procedure as that set forth in Example D was employed but herein 92 grams of aniline and 114 grams of heptaldehyde were employed. The substantially completely dehydrated aniline-heptaldehyde reaction product was a liquid having a viscosity of about 200 cp. at 25° C. and is hereinafter known as Product E. At least 50% by weight of Product E is monomeric anhydroheptaldehydeaniline apparently of the following formula: $C_6H_5—N=CH—C_6H_{13}$.

Example F 92 grams of aniline and 162 grams of isodecaldehyde were charged into a glass reaction vessel equipped with a reflux condenser and having a stirrer therein. While being constantly stirred, the mass in said vessel, by the use of external heat, was elevated to and maintained at approximately 100° C. for a period of 1 hour whereupon water of reaction comes off. Then the mass in said vessel, while being maintained under sub-atmospheric conditions of 10 mm. of mercury pressure, was heated slowly to 150° C. to remove any volatiles and water present leaving behind aniline-isodecaldehyde organic reaction product having a viscosity of about 100 cp. at 25° C. and is hereinafter known as Product F at least 50% by weight of which is monomeric anhydroisodecaldehydeaniline, apparently of the formula $C_6H_5-N=CH-C_9H_{19}$.

Example G 92 grams of aniline and 140 grams of ethylhexaldehyde were charged into a glass reaction vessel equipped with a reflux condenser and a stirrer. The mass therein, by the use of external heat was maintained at a temperature slightly above the boiling point of water for a period of about 1 hour. Then the resultant mass in said vessel, while being maintained under sub-atmospheric conditions of 10 mm. of mercury pressure, was slowly heated to 150° C. to completely strip off any water and light volatiles leaving behind in said vessel the aniline-ethylhexaldehyde organic reaction product having a viscosity of about 200 cp. at 25° C. and is hereinafter known as Product G. At least 50% by weight of Product G was monomeric anhydroethylhexaldeaniline, apparently of the formula $C_6H_5-N=CH-C_7H_{15}$.

Example H 92 grams of aniline and 50 grams of butyraldehyde were charged into a glass reaction vessel equipped with a stirrer and reflux condenser. The mass therein was heated to a temperature of about 90° C. and maintained at that temperature for 15 minutes. Then 30 grams of aqueous formaldehyde (37% con.) was added to said mass in said vessel. The entire mass therein was then heated to and maintained at 100° C.–110° C. for a period of 1 hour. The resultant mass, while being maintained under sub-atmospheric conditions of 10 mm. of mercury pressure was slowly heated to 150° C. to substantially completely dehydrate the same and remove any light volatiles therefrom leaving behind in said vessel a mixture of monomeric anhydrobutyraldehydeaniline and a trimer of monomeric anhydroformaldehydeaniline having a viscosity of about 1000 cp. at 25° C. and is hereinafter known as Product H.

Example I 53 grams of o-toluidine were charged into an open glass reaction vessel. Then, while said o-toluidine is constantly stirred, there is slowly added thereto 40 grams of butyl aldehyde whereupon an exothermic reaction takes place and is permitted to continue. One hour thereafter the reaction mass, while under sub-atmospheric conditions of 10 mm. of mercury pressure, is slowly heated to about 150° C. to substantially completely dehydrate the mass and remove any volatiles, leaving behind a liquid Product I having a viscosity of 100 cp. at 25° C. and more than 50% by weight of which is monomeric anhydrobutylaldehydeorthotoluidine.

Examples J and K

Employing the same procedure and components as those set forth in Example I, except that 53 grams of m-toluidine and p-toluidine respectively were substituted for said 53 grams of o-toluidine, there were produced substantially completely dehydrated liquid reaction products, known hereinafter as Products J and K, having respective viscosities of about 1000 and 1500 cp. at 25° C. and respectively containing monomeric anhydrobutylaldehyde-metatoluidine and monomeric anhydrobutylaldehydeparatoluidine measuring more than 50% by weight of Products J and K respectively.

Examples L–N

Employing the same procedure and components as those of Example I except that 60 grams of mixed xylidines, 60 grams of 2,5-xylidine and 60 grams of 2,4-xylidine were respectively substituted for the 53 grams of o-toluidine, whereby there were produced substantially completely dehydrated liquid reaction Products L–N respectively having viscosities of about 100 cp. at 25° C. and respectively containing monomeric anhydrobutylaldehyde-mixed xylidines, monomeric anhydrobutylaldehyde-2,5-xylidine and monomeric anhydrobutylaldehyde-2,4-xylidine measuring by weight more than 50% of Products L–N respectively.

All of said Products B–N were tested and found to be soluble in acetone, methyl ethyl ketone as well as other ketones. They were also found to be soluble in aliphatic alcohols such as methyl, ethyl, propyl, and other aliphatic alcohols as well as in furfuryl alcohol.

All of said Products A–N were found to be soluble in urea-formaldehyde resins, melamine-formaldehyde resins, thermosetting phenol-formaldehyde resins, and aniline-formaldehyde resins. They were also found to be soluble in, or to form solutions with, phenols such as hydroxy benzene, xylenols, cresols, resorcinol, cashew nut shell liquid and other monohydric and polyhydric phenols capable of reacting with formaldehyde in the presence of an acid catalyst to form thermosetting resins. They were also found to be soluble in diethyl sulfate and hot concentrated sulfuric acid. They were unexpectedly found to be soluble in, or capable of forming solution with, polyepoxides having a vicinal epoxy equivalency greater than one. They may be combined with said polyepoxides and such two-component combinations have a shelf life of more than 6 months at 70° F. which also was unexpected. Said two-component combinations may be sold commercially as such to the ultimate consumer who then adds the desired curing agent and/or one or more of said phenol and/or phenol-aldehyde modifiers thereto to provide curable compositions of particular properties desired. They were found to be insoluble in water, caustic solutions and dilute acid solutions. All of said Products A–N are non-resinous and said Products B–N consisted mainly of monomeric compounds. My tests indicated that at least 70% by weight of said Products A–N are monomeric, dimeric and/or trimeric and that at least 50% by weight of said Products B–N are monomers.

The following are examples given by way of illustration and not limitation of some of the novel compositions of this invention in which said non-resinous monomers, dimers and trimers are employed as components thereof, all parts being given by weight unless otherwise specified.

Example 1

95 parts "Shell Epon 828" (glycidyl polyether of 2,2-bis-parahydroxy phenyl propane), 80 parts of sebacic acid anhydride, and 5 parts of Product A were mixed together to uniformity. ("Shell Epon 828" is a liquid, has an epoxide equivalent of 175–210 and an average molecular weight of 350–400.) The three component mass was then heated to and maintained at a temperature of 120° C. for approximately 30 to 40 minutes. The resultant mass was then examined and was found to have been converted to the substantially solid and infusible state which was surprising and unexpected since in the absence of said Product A, the aforesaid composition required about 8 hours at 120° C. to be converted to the substantially solid and infusible state. The aforedescribed three component mass has a shelf life at 70° C. of 12 months.

Example 2

100 parts of "Shell Epon 828," 80 parts of sebacic acid anhydride and 1 part of Product B were mixed to uniformity. The 3-component mass was heated to and maintained at 120° C. for about 30 minutes. At the end of that period the mass was found to have been converted to the substantially solid and infusible state. The 3-component mass has a shelf life of more than six months at 70° F.

Example 3

100 parts of "Shell Epon 828," 80 parts of sebacic acid anhydride and 2 parts of Product B were mixed to uniformity and then heated to and maintained at 120° C. for about 30 minutes. At the end of the period the mass was found to have been converted to the substantially solid and infusible state. The shelf life of said 3-component mass was found to be well over 3 months at 70° C.

*Example 4*

100 parts of "Shell Epon 828," 80 parts of sebacic acid anhydride, 3 parts of Product D were mixed together to uniformity and then the 3-component mass was heated to and maintained at 120° C. for 1 hour. At the end of that period the mass was found to have been converted to the substantially solid and infusible state. The 3-component mass has a shelf life well over 3 months at 70° C.

*Example 5*

30 parts by weight of "Shell Epon 828," 30 parts of methyl nadic acid anhydride and 1 part of Product B were mixed together to uniformity and then the 3-component mass was heated to and maintained at 120° C. for 1 hour. At the end of that period the mass was found to have been converted to the substantially solid and infusible state. The shelf life of said 3-component mass was found to be well over 2 months at 70° F. The aforesaid 3-component mass, but without Product B, thus making it a 2-component mass, required over 24 hours at 120° C. to be converted to the substantially solid and infusible state.

*Example 6*

50 parts of "Shell Epon 828," 17.5 parts of phthalic acid anhydride, and 1.5 parts of Product B were mixed together to uniformity and then said 3-component mass was heated to and maintained at 120° C. for 30 minutes. At the end of that period the mass was found to have converted to the substantially solid and infusible state. The shelf life of said 3-component mass is over 3 months at 70° F. The aforesaid mass without product B required 10 to 12 hours at 120° C. in order to be converted to the substantially solid and infusible state.

*Examples 7–12*

Six mixes, each consisting of 5 grams of "Shell Epon 828" and 5 grams of methyl nadic acid anhydride were respectively combined with 0.1 gram of Products I–N respectively and said resultant six 3-component masses, hereinafter known as Masses 7–12, were heated to and maintained at 120° C. until they were gelled, that is, converted to the substantially solid and infusible state and the time for conversion was noted to be as follows: Mass 1 required 5 hours; mass 2 required 50 minutes; mass 3 required 35 minutes; mass 4 required 3 hours; mass 5 required 2 hours and mass 6 required 7 hours.

All of said 3-component masses of said Examples 1–12 are suitable for use in the encapsulating of electrical components. They may be charged into the containers carrying said components and then are heat cured therein. They may be thinned with an organic solvent, such as methyl ethyl ketone and such solution may be spread on a surface to be coated such as woven glass cloth, which is then heated to drive off the solvent and cure the solvent-free mass thereon, or if desired the mass on the glass cloth may be only partially cured and then a sheet of glass cloth is placed thereon and heated, with or without pressure, thereby to cure the mass to its ultimate cured state and thereby to provide a laminated structure. It is to be understood, of course, that any of the other polyepoxides may be substituted for said "Shell Epon 828" and any of the other polycarboxylic acid curing agents may be substituted for those employed in said Examples 1–12. Also, any of the other monomers, dimers and trimers may be substituted for those used in said examples. However, in certain instances, it is preferred to use only those monomers produced from saturated aliphatic aldehydes of at least 2 carbon atoms for the reason that when compounds, such as Product A are used, fuming occurs and this does not occur when the other Products B–N are used.

*Examples 13–26*

80 parts of "Shell Epon 828," 20 parts of Products A–N respectively were stirred together for uniformity and then 8 parts of diethylene triamine were added thereto with or without inert fillers and stirred to uniformity. The resultant masses were spread on a surface to be covered or coated and permitted to remain in a room at 70°F. Twenty-four hours thereafter they were examined and were found to have been converted to the substantially solid and infusible state to provide tough, chemically resistant, protective coatings or coverings.

While some of the polyamines which are useful as curing agents for the polyepoxides employed in this invention are capable of forming solutions with said monomers, dimers and trimers, some of them are not as soluble as others, an example of the latter is dicyandiamide. When those polyamines of such lower solubility are employed and/or when the normally solid polyepoxides such as "Shell Epon 1001, 1004, 1007" etc. are employed, I prefer to use a thinner or solvent as shown in the following Example 27. ("Shell Epon 1001, 1004 and 1007" are glycidyl polyethers of 2,2-bis-parahydroxy phenyl propane. "Shell Epon 1001" has melting point of 64°–76° C., epoxide equivalent of 450–525 and average molecular weight of 900–1000. "Shell Epon 1004" has melting point of 95°–105° C., epoxide equivalent of 870–1025 and average molecular weight of 1,400. "Shell Epon 1007" has melting point of 125°–132° C., epoxide equivalent of 1,650–2,050 and molecular weight 2,900.)

*Example 27*

100 parts of "Shell Epon 1001," 6 parts of dicyandiamide and 10 parts of Product B are mixed together and thinned with 100 parts of a thinner consisting of equal parts of toluene and methyl ethyl ketone. The thin mass is spread as a thin film on an object, such as woven glass cloth, to be coated and is then heated to a temperature of 350° F. to drive off the solvent and is maintained at that temperature where upon the substantially solvent-free mass is cured to the substantially solid and infusible state as a tough, chemically resistant, flexible protective coating.

Said monomers, dimers and trimers have been found to be compatible with monohydric and polyhydric phenols which are aldehyde-reactive on the aromatic nuclei thereof in the presence of an acid catalyst to produce thermosetting resins and said monomers, dimers and trimers have been found to be capable of being reacted with said phenols and such reaction products or mere physical combination of said compounds of the aforesaid formula and said phenols and/or thermosetting phenol-aldehyde resins may be combined with said polyepoxides together with a polyepoxide curing agent to provide novel masses which may be cured to the substantially solid and infusible state.

Compositions of matter consisting of any of said monomers, dimers or trimers physically combined or reacted with said phenols or thermosetting phenol-aldehyde resins find application in the encapsulating, coating and liminating fields when combined with said polyepoxides.

It is to be understood that a combination of two or more of said polyepoxides, two or more of said curing agents therefor, and/or two or more of said non-resinous monomers, dimers and trimers may be employed in the production of some of the novel compositions of the present invention. In fact, I have discovered that in some instances the presence of said monomers, dimers and trimers when used with certain mixed polyepoxides and polycarboxylic acid curing agents therefor aid in the solubilizing of the mixed polyepoxides and polycarboxylic curing agent in the course of the heat curing step.

Since certain changes may be made in the aforesaid compositions of matter and different embodiments of the invention could be made without departing from the scope thereof, it is intended that all matter contained in the above description shall be interpreted as illustrative and not in a limiting sense.

It is to be understood that the following claims are intended to cover generic and specific features of the invention herein described and all statements of the scope of the invention which as a matter of language might be said to fall therebetween, and that they are intended to be inclusive in scope and not exclusive in that, if desired, other materials may be added to my novel compositions of matter herein claimed without departing from the spirit of the invention. Particularly it is to be understood that in said claims ingredients or components recited in the singular are intended to include compatible mixtures of said ingredients wherever the sense permits.

I claim:

1. A composition of matter comprising (A) a polyepoxide having a vicinal epoxy equivalency greater than 1, being heat curable in the presence of a polycarboxylic acid curing agent therefor and being a glycidyl polyether of a polyhydric phenol, (B) a polycarboxylic acid curing agent for (A) and (C) a curing-accelerator, said (C) selected from the group consisting of (a) monomers of the formula:

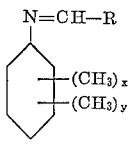

wherein R is an alkyl radical of 3–15 carbon atoms; $x$ is selected from the group consisting of 0 and 1; and $y$ is selected from the group consisting of 0 and 1, (b) dimers of (a) and (c) trimers of (a), the ratio by weight of (C) to (A) being 0.5–25 parts of (C) to 100 parts of (A).

2. A composition of matter comprising (A) polyepoxide having a vicinal epoxy equivalency greater than 1, being heat curable in the presence of a polycarboxylic acid curing agent therefor and being a glycidyl polyether of a polyhydric phenol, (B) a polycarboxylic acid curing agent for (A) and (C) a curing-accelerator of the following formula:

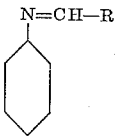

wherein R is an alkyl radical of 3–15 carbon atoms; the ratio by weight of (C) to (A) being 0.5–25 parts of (C) to 100 parts of (A).

3. A composition of matter comprising (A) a polyepoxide having a vicinal epoxy equivalency greater than 1, being heat curable in the presence of a polycarboxylic acid curing agent therefor and being a glycidyl polyether of a polyhydric phenol, (B) a polycarboxylic acid curing agent for (A) and (C) a curing-accelerator of the following formula:

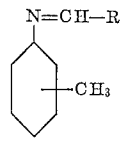

wherein R is an alkyl radical of 3–15 carbon atoms; the ratio by weight of (C) to (A) being 0.5–25 parts of (C) to 100 parts of (A).

4. A composition of matter comprising (A) a polyepoxide having a vicinal epoxy equivalency greater than 1, being heat curable in the presence of a polycarboxylic acid curing agent therefor and being a glycidyl polyether of a polyhydric phenol, (B) a polycarboxylic acid curing agent for (A) and (C) a curing-accelerator of the following formula:

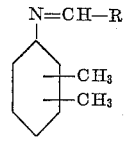

wherein R is an alkyl radical of 3–15 carbon atoms; the ratio by weight of (C) to (A) being 0.5–25 parts of (C) to 100 parts of (A).

5. A composition of matter comprising (A) a polyepoxide having a vicinal epoxy equivalency greater than 1, being heat curable in the presence of a polycraboxylic acid curing agent therefor and being a glycidyl polyether of a polyhydric phenol, (B) a polycarboxylic acid curing agent for (A) and (C) a curing-accelerator of the following formula:

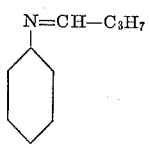

wherein R is an alkyl radical of 3–15 carbon atoms; the ratio by weight of (C) to (A) being 0.5–25 parts of (C) to 100 parts of (A).

6. A composition of matter comprising (A) a polyepoxide having a vicinal epoxy equivalency greater than 1, being heat curable in the presence of a polycarboxylic acid curing agent therefor and being a glycidyl polyether of a polyhydric phenol, (B) a polycarboxylic acid curing agent for (A) and (C) a curing-accelerator of the following formula:

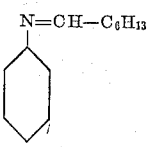

wherein R is an alkyl radical of 3–15 carbon atoms; the ratio by weight of (C) to (A) being 0.5–25 parts of (C) to 100 parts of (A).

7. A composition of matter as defined in claim 1, wherein (B) is sebacic acid and (C) is (a).

8. A composition of matter as defined in claim 1, wherein (B) is sebacic acid, (C) is (a) and R is $C_3H_7$.

9. A composition of matter as defined in claim 1, wherein (A) is normally liquid.

References Cited by the Examiner

UNITED STATES PATENTS 2,136,928  11/38  Schlack _____ 260—2
2,511,913  6/50  Greenlee _____ 260—45.2 X

OTHER REFERENCES

Lee et al.: "Epoxy Resins," pages 157–158, July 1957.
Skeist: "Epoxy Resins," Rheinhold Pub. Corp., N.Y., 1958, page 29.

WILLIAM H. SHORT, *Primary Examiner.*

JOSEPH R. LIBERMAN, JOSEPH L. SCHOFER,
*Examiners.*